UNITED STATES PATENT OFFICE.

WALLACE A. BEATTY, OF NEW YORK, N. Y., ASSIGNOR, BY DIRECT AND MESNE ASSIGNMENTS, TO GEORGE W. BEADLE, OF NEW YORK, N. Y.

PROCESS OF MANUFACTURING ACETIC ANHYDRID.

1,113,927.  Specification of Letters Patent.  Patented Oct. 13, 1914.

No Drawing. Application filed April 30, 1912, Serial No. 694,275. Renewed January 21, 1913. Serial No. 743,420.

*To all whom it may concern:*

Be it known that I, WALLACE A. BEATTY, a citizen of the United States, residing at New York, in the county of New York and State of New York, have invented certain new and useful Improvements in Processes for Manufacturing Acetic Anhydrid, of which the following is a specification.

The present invention relates to a process for manufacturing certain anhydrids, and consists in the methods of procedure hereinafter described and set forth in the claims.

The object of the invention is to devise a process for cheaply manufacturing acetic anhydrid on a large scale whereby to obtain large quantities thereof for ordinary commercial purposes.

The process consists preferably in uniting the substances in substantially the following proportions and in the following arranged order of steps:

(1). Sulfuric anhydrid ($SO_3$) eighty pounds and carbon tetra-chlorid ($CCl_4$) slightly more than one hundred and fifty-four pounds are allowed to react together either by passing the sulfuric anhydrid through the carbon tetra-chlorid heated to its boiling point and with proper condensation of the products of the reaction, or by passing the vapors through a heated tube at about 80° C. and with proper condensation of the products of the reaction; viz:

$$SO_3 + CCl_4 = SO_2Cl_2 + COCl_2.$$
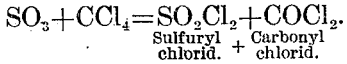

or $$2SO_3 + CCl_4 = S_2O_5Cl_2 + COCl_2.$$
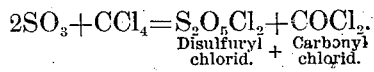

Probably both reactions occur more or less.

(2). The mixture ($SO_2Cl_2 + COCl_2$) is allowed to react with dry alkali metal acetate or with alkaline earth metal acetate or with a mixture of both (viz. sodium acetate or calcium acetate or mixture of the two) care being taken to prevent overheating due to the reaction and also that the vapor may be thoroughly mixed with the salt, either by passing them over the salt spread in thin layers or by continued agitation of the salt.

The chemicals are used in substantially the following proportions:

$SO_3$ (80 lbs.) + $CCl_4$ (154 lbs.) + $8NaCH_3COO$ (656 lbs.) = $Na_2SO_4 + Na_2CO_3 + 4NaCl + 4(CH_3CO)_2O$.

The reaction of $SO_3$ and carbon tetrachlorid on the alkali salt may be produced so that acetyl chlorid is formed as an intermediate product and the anhydrid will be produced by the further action of acetyl chlorid on the alkali or alkaline earth salts, viz:

(1) $SO_3 + CCl_4 + 3NaCH_3COO = Na_2SO_4 + 3CH_3COCl + NaCl + CO_2$.

(2) $3CH_3COCl + 3NaCH_3COO = 3(CH_3CO)_2O + 3NaCl$.

The acetic anhydrid is distilled from the resultant mass preferably in a vacuum.

While certain specific instances are herein given for carrying out the process it is to be understood that such limitations need not necessarily be adhered to, but rather that the invention is to be interpreted within the scope of the general claims.

What is claimed as new is:

1. A process of producing certain anhydrids which comprises mixing sulfuric anhydrid with carbon tetra-chlorid and reacting with the products thereby produced, upon a salt of the acid, the anhydrid of which is desired, substantially as described.

2. A process of producing acetic anhydrid which comprises mixing sulfuric anhydrid with carbon tetra-chlorid and reacting with the products thereby produced, upon an alkali metal acetate, substantially as described.

3. A process of producing acetic anhydrid which comprises mixing sulfuric anhydrid with carbon tetra-chlorid and reacting with the products thereby produced, upon an acetate, substantially as described.

4. A process of producing acetic anhydrid which comprises mixing sulfuric anhydrid with carbon tetra-chlorid and reacting with the products thereby produced, upon an alkali metal acetate and an alkaline earth metal acetate, substantially as described.

5. A process of producing acetic anhydrid which comprises mixing sulfuric anhydrid with carbon tetra-chlorid and reacting with the products thereby produced, upon sodium acetate, substantially as described.

6. A process of producing acetic anhydrid which comprises mixing sulfuric anhydrid with a chlorin substitution product of a hydrocarbon and reacting with the products thereby produced, upon sodium and calcium acetates, substantially as described.

7. A process of producing an organic anhydrid which comprises passing sulfuric anhydrid through heated carbon tetra-chlorid and subjecting the products thereby produced to the action of an alkali metal salt of the acid, the anhydrid of which is desired substantially as described.

8. A process of producing an organic anhydrid which comprises passing sulfuric anhydrid through carbon tetra-chlorid heated to boiling point and treating the reaction products thereof with a dry alkali metal salt of said organic acid, substantially as described.

9. A process of producing organic anhydrids which comprises mixing sulfuric anhydrid with an organic tetra-chlorid and reacting with the products thereby produced, upon an alkali metal salt to obtain a chlorid of an organic acid radical, and then treating the chlorid so produced with an alkali salt of the same acid to obtain the desired anhydrid, substantially as described.

10. A process of producing acetic anhydrid which comprises reacting upon an acetate with the reaction products of a halogen substitution product of a hydrocarbon of the paraffin series, and an anhydrid of a relatively strong acid, at a reacting temperature.

11. A process of making an anhydrid of an organic acid which comprises reacting with a heated mixture of the reaction products of an anhydrid of a mineral acid and a halogen substitution product of a hydrocarbon on a salt of the acid corresponding to said organic anhydrid, while regulating the temperature of the reacting materials.

12. A process of making an anhydrid of an organic acid which comprises reacting upon a salt of such an acid with the reaction products of a halogen substitution product of a hydrocarbon and an anhydrid of a mineral acid.

13. A process of making an anhydrid of an organic acid said process comprising reacting upon a salt of the acid with carbonyl chlorid and sulfuryl chlorid.

In testimony whereof I affix my signature in presence of two witnesses.

WALLACE A. BEATTY.

Witnesses:
   H. H. BYRNE,
   CHAS. E. BRECKONS.